US012721707B2

(12) United States Patent
Burrows

(10) Patent No.: US 12,721,707 B2
(45) Date of Patent: Sep. 1, 2026

(54) BIODEGRADABLE DENTAL FLOSSING DEVICE

(71) Applicant: Bal Burrows, Delta (CA)

(72) Inventor: Bal Burrows, Delta (CA)

(*) Notice: Subject to any disclaimer, the term of this patent is extended or adjusted under 35 U.S.C. 154(b) by 0 days.

(21) Appl. No.: 19/256,056

(22) Filed: Jun. 30, 2025

(65) Prior Publication Data

US 2025/0325356 A1 Oct. 23, 2025

Related U.S. Application Data

(63) Continuation-in-part of application No. 18/052,046, filed on Nov. 2, 2022, now abandoned.

(51) Int. Cl.
*A61C 15/04* (2006.01)

(52) U.S. Cl.
CPC .................................. *A61C 15/046* (2013.01)

(58) Field of Classification Search
None
See application file for complete search history.

(56) References Cited

U.S. PATENT DOCUMENTS

D49,907 S * 11/1916 Muchow ........................ D28/66
2,187,899 A * 1/1940 Henne .................. A61C 15/048 D28/68
2,443,415 A * 6/1948 Buscarino ............ A61C 15/046 132/323
3,918,466 A * 11/1975 Peebles, Jr. .......... A61C 15/046 132/323
4,006,750 A * 2/1977 Chodorow ........ B29C 45/14565 264/251
4,013,085 A * 3/1977 Wright .................... B29C 55/04 132/323
4,941,488 A * 7/1990 Marxer .................. A61C 15/04 132/323
5,014,725 A * 5/1991 Patscot ................ A61C 15/046 132/324
5,101,843 A * 4/1992 Peng .................... A61C 15/046 132/323
D352,801 S * 11/1994 Chung ........................... D28/68
5,704,379 A * 1/1998 Krynicki .............. A61C 15/046 132/323
5,860,434 A * 1/1999 Sines .................. A61C 15/046 132/325
D460,583 S * 7/2002 Antler ............................ D28/65
D461,282 S * 8/2002 Antler ............................ D28/65
D665,131 S * 8/2012 Nanda ............................ D28/66
(Continued)

*Primary Examiner* — Tatiana L Nobrega
(74) *Attorney, Agent, or Firm* — Orin Del Vecchio

(57) ABSTRACT

A biodegradable dental floss device formed from a body formed from cardboard and a segment of dental floss. The body comprises a grip, a first arm extending from the grip; a spacer extending from the grip perpendicular to the first arm; and a second arm extending from the spacer parallel to the first arm such that a void is formed between the first arm, the spacer and the second arm. The segment of dental floss is secured to the first arm and to the second arm such that the segment of dental floss extends across the void. The segment of dental floss is secured to the first arm via journalling through a first hole in the first arm and being bonded to the first arm, and secured to the second arm via journalling through a second hole in the second arm and being bonded to the second arm.

5 Claims, 3 Drawing Sheets

(56) References Cited

U.S. PATENT DOCUMENTS

| | | | | |
|---|---|---|---|---|
| D711,049 S * | 8/2014 | Nanda | A61C 15/04 D21/805 |
| 2021/0121273 A1* | 4/2021 | Whitman | A61C 15/046 |
| 2023/0046760 A1* | 2/2023 | Jalbert | A61C 15/046 |

* cited by examiner

BIODEGRADABLE DENTAL FLOSSING DEVICE

FIELD OF THE INVENTION

The present specification relates generally to a dental flossing device, and more particularly to a biodegradable dental flossing device.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

The flossing of one's teeth is generally considered as a component of oral hygiene, along with brushing and rinsing with mouthwash or similar products. Traditional dental floss consists of nylon filaments, which may be coated in wax, with the floss dispensed from a roll and cut to a desired usable length (~40 cm) using a blade on the container. The cut floss is then wrapped or held between the user's fingers and guided between the teeth to remove food particles caught between the teeth and in the gumline.

Some people, particularly children, may have difficulty with flossing using dental floss alone, so dental flossing devices have been developed, the most common know as floss picks. Floss picks have a strand of dental floss secured to a handle, and may be reusable or disposable, with the disposable type being more common.

However, disposable floss picks are generally made from plastic or plastic-coated materials, leading to extensive accumulating waste estimated at thousands of tons a year. Accordingly, it would be preferable for a dental floss device to be designed from a biodegradable material, while remaining rigid enough to use for dental flossing.

Accordingly, there remains a need for improvements in the art.

SUMMARY OF THE INVENTION

In accordance with an aspect of the invention, there is provided a biodegradable dental floss device.

According to an embodiment of the invention, there is provided a biodegradable dental floss device, comprising: a body, the body comprising: a grip, the grip formed as a solid regular shape; a first arm, the first arm extending from the grip; a spacer, the spacer extending from the grip perpendicular to the first arm; a second arm, the second arm extending from the spacer parallel to the first arm such that a void is formed between the first arm, the spacer and the second arm; and a segment of dental floss, the segment of dental floss secured to the first arm and to the second arm such that the segment of dental floss extends across the void. The segment of dental floss is secured to the first arm via journalling through a first hole in the first arm and being bonded to the first arm, and the segment of dental floss is secured to the second arm via journalling through a second hole in the second arm and being bonded to the second arm.

According to a further embodiment of the invention, the body may be formed from a unitary piece of cardboard. The dental floss may also be formed from a biodegradable material, such as bamboo.

The shape of the head portion may be one of: semi-circular, rectangular and trapezoidal.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which.

Like reference numerals indicated like or corresponding elements in the drawings.

DETAILED DESCRIPTION OF THE EMBODIMENTS

The present invention relates generally to a dental flossing device, and more particularly to a biodegradable dental flossing device.

Figure 1:
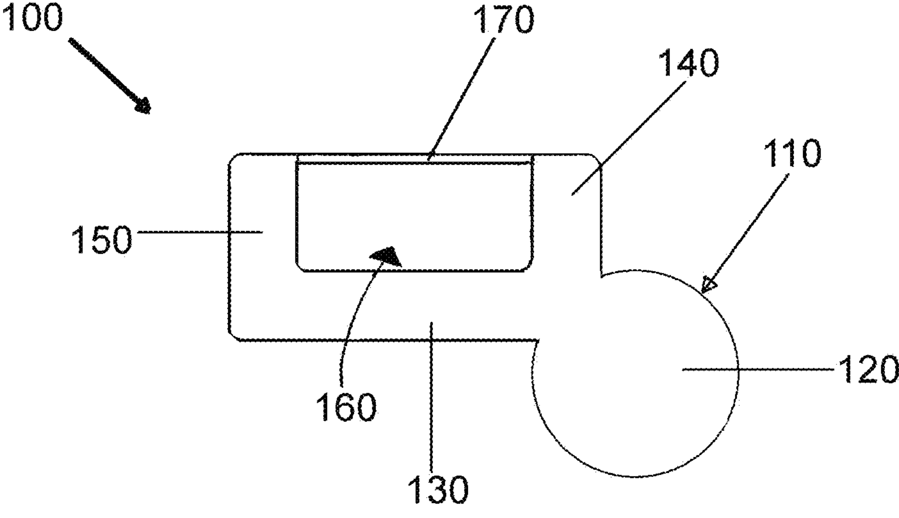
FIG. 1 is a side view of a biodegradable dental flossing device according to an embodiment.

According to an embodiment as shown in FIG. 1, a biodegradable dental flossing device 100 is composed of a body 110, the body formed from a grip 120, and spacer 130, a first arm 140 and a second arm 150. The spacer 130, the first arm 140 and the second arm 150 define a void 160. A segment of dental floss 170 extends across the void 160 between the first arm 140 and the second arm 150.

Figure 2:
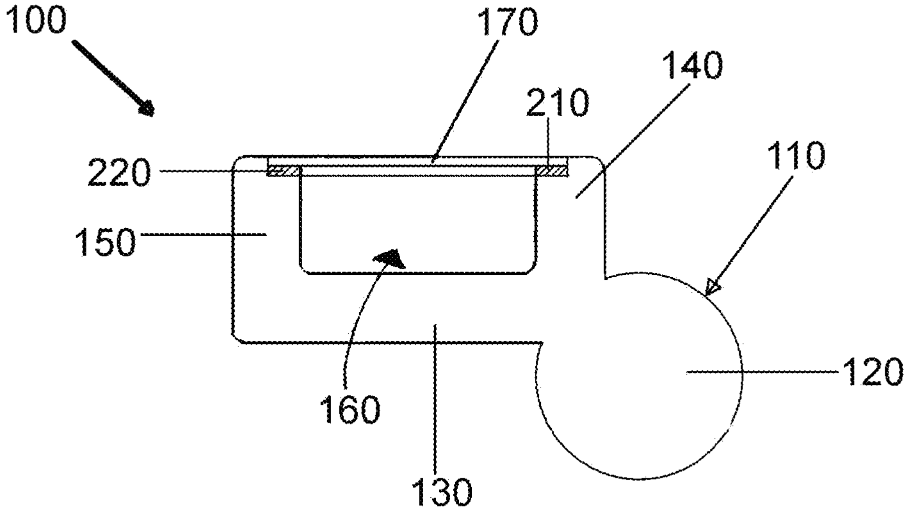
FIG. 2 is a transparent view of FIG. 1.

As shown in FIG. 2, The segment of dental floss 170 is secured to the first arm 140 via journalling through a first hole 210 in the first arm 140, where the first hole 210 extends partially through the first arm 140. Similarly, the segment of dental floss 170 is secured to the second arm 150 via journalling through a second hole 220 in the second arm 150, where the second hole 220 extends partially through the second arm 150.

The segment of dental floss 170 is secured to both the first arm 140 and the second arm 150. Preferably, a bonding agent, such as a biodegradable and food-safe glue, is used to fill the first hole 210 and the second hole 220 to bond the segment of dental floss in position.

The body 110 is formed form cardboard, preferably as a unitary piece of cardboard. The cardboard may be of a solid piece, or a crenulated piece, as desired. The shape of the body 110 may vary, however, as shown, the grip 120 is circular, the spacer 130, first arm 140 and second arm 150 are rectangular, with the first arm 140 and the second arm 150 of the same length. The void 160 is thus defined as a rectangular shape.

As the intended dental floss device 100 is a single-use device, it is understood that the combination of biodegradable materials and the biodegradable adhesive is durable enough for the intended single use, while remaining biodegradable within a reasonable time period. Further, while the segment of dental floss 170 is sufficiently small that standard nylon floss may be used, it is preferable that the segment of dental floss 170 is also formed from a biodegradable material, such as bamboo.

Figure 3A:
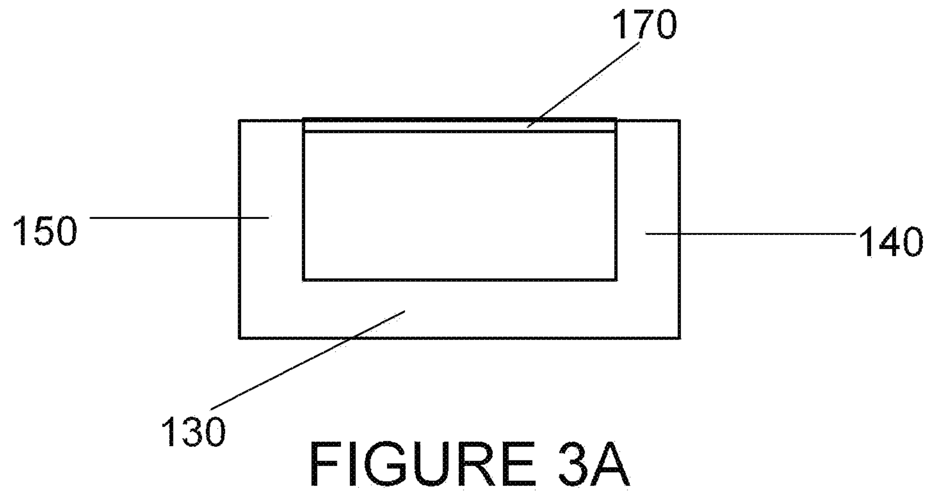
FIGS. 3A-3C are plan views of alternate shape of the head portion.
Figure 3B:
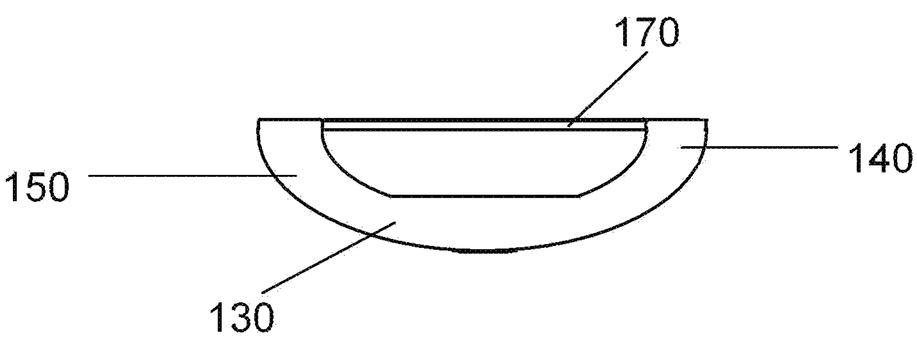
Figure 3C:
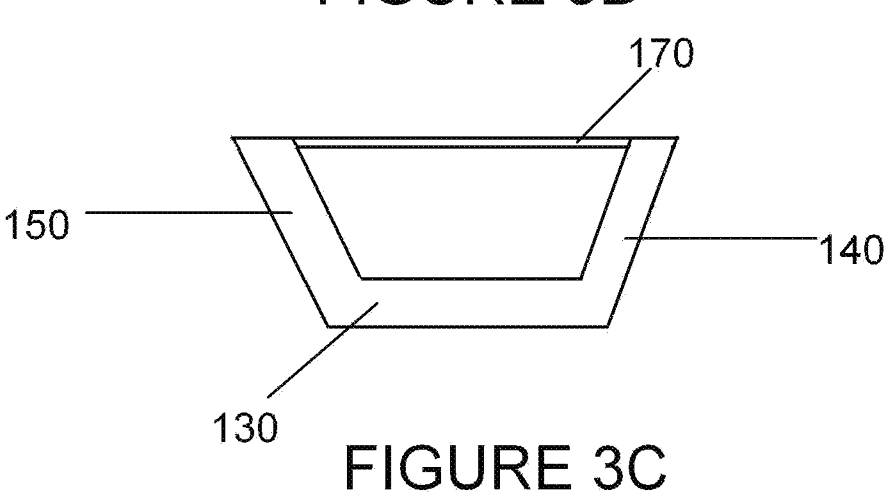

As illustrated in FIGS. 3A-3C, the body 110 may take different shapes based on different shapes and dimensions for the first arm 140, spacer 130 and second arm 150. Preferred shapes may include rectangular (FIG. 3A), semicircular (FIG. 4B) and trapezoidal (FIG. 4C), although other shapes may be used.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the Patent and Trademark Office and the public generally, and especially the scientist, engineers and practitioners in the art who are not familiar with patent or legal terms or phraseology, to determine quickly from a cursory inspection the nature and essence of the technical disclosure of the application.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A biodegradable dental floss device, comprising:

a body defined by:

i) a first arm having a first outer edge opposite a first inner edge, and a first distal edge between the first outer and inner edges, where a first rounded corner exists between the first outer edge and the first distal edge;

ii) a second arm having a second outer edge opposite a second inner edge, and a second distal edge between the second outer and inner edges, wherein a second rounded corner exists between the second outer edge and the second distal edge;

iii) a spacer having a lower edge opposite an upper edge, a first lateral edge extending transversely from the lower edge toward the upper edge at a second end of the spacer, and a first end portion opposite the second end, where a third rounded corner exists between the lower edge and the first lateral edge, a fourth rounded corner exists between the upper edge and the first inner edge and a fifth rounded corner exists between the upper edge and the second inner edge;

iv) a void disposed between the upper edge of the spacer and the first and second distal edges of the first and second arms and between the first and second inner edges of the first and second arms, wherein the void has a rectangular shape;

v) a circular grip extending from the first end portion of the spacer such that a boundary of the circular grip extends downwardly from the lower edge until reaching a minimum, the boundary extends upwardly from the minimum until reaching a maximum, and the boundary extends downwardly from the maximum until intersecting with the second end portion of the spacer;

wherein each of the first inner edge, the first outer edge, the first distal edge, the second inner edge, the second outer edge, the second distal edge, the lower edge, the upper edge and the first lateral edge are linear;

wherein the first and second arms extend in parallel, the first and second upper and lower edges are in parallel, and the first and second distal edges are colinearly aligned;

wherein the first lateral edge merges and is colinear with the second outer edge of the second arm such that the second arm extends transversely from the second end of the spacer, and the first arm extends transversely from the first end portion of the spacer;

wherein the center point of the circular grip is disposed below the lower edge and offset from the first arm such that no portion of the circular grip extends directly below the void;

wherein the body is formed as a planar unitary body made solely of uncoated cardboard; and a segment of dental floss having a first end secured to a distal portion of the first arm and a second end secured to a distal portion of the second arm such that the segment of floss extends across the void.

2. The biodegradable floss device of claim 1, wherein the distal portion of the first arm includes a first hole and the distal portion of the second arm includes a second hole, wherein the segment of floss is secured to the body by journaling the first end of the segment of floss through the first hole and bonding the first end to the first arm and journaling the second end of the segment of floss through the second hole and bonding the second end to the second arm.

3. The biodegradable dental floss device of claim 2, where the segment of floss is bonded to the first arm and is bonded to the second arm via heat bonding.

4. The biodegradable dental floss device of claim 1, wherein the first arm and the second arm are equal in length.

5. The biodegradable dental floss device of claim 1, wherein the segment of dental floss is formed from a biodegradable material.

* * * * *